E. KESSLER.
HOSE COUPLING ESPECIALLY APPLICABLE TO PRESSURE AND VACUUM BRAKE PIPES.
APPLICATION FILED OCT. 31, 1919.
1,343,084.
Patented June 8, 1920.
3 SHEETS—SHEET 1.
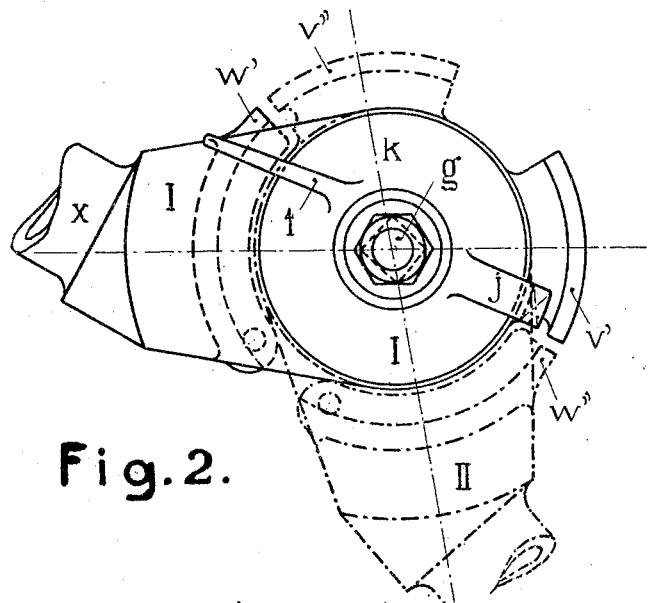
Fig. 2.
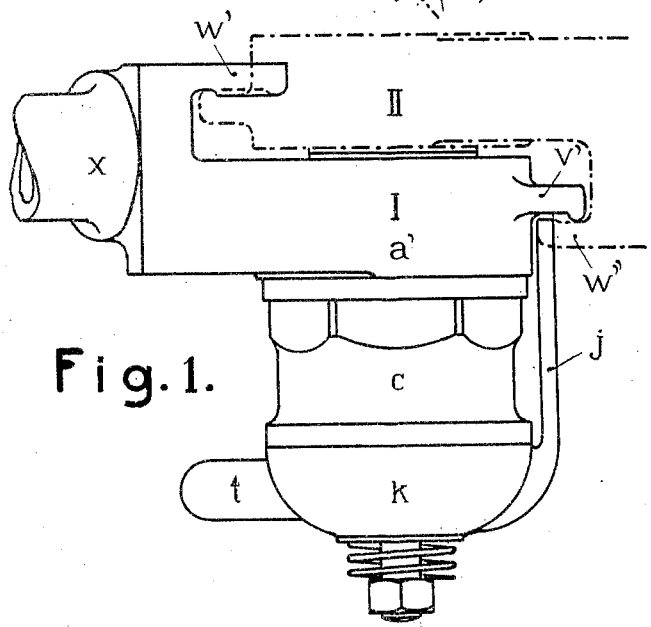
Fig. 1.
INVENTOR
ERNST KESSLER
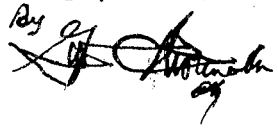

E. KESSLER.
HOSE COUPLING ESPECIALLY APPLICABLE TO PRESSURE AND VACUUM BRAKE PIPES.
APPLICATION FILED OCT. 31, 1919.

1,343,084.

Patented June 8, 1920.
3 SHEETS—SHEET 2.

INVENTOR
ERNST KESSLER

E. KESSLER.
HOSE COUPLING ESPECIALLY APPLICABLE TO PRESSURE AND VACUUM BRAKE PIPES.
APPLICATION FILED OCT. 31, 1919.

1,343,084.

Patented June 8, 1920.
3 SHEETS—SHEET 3.

INVENTOR
ERNST KESSLER

UNITED STATES PATENT OFFICE.

ERNST KESSLER, OF BIEL, SWITZERLAND.

HOSE-COUPLING ESPECIALLY APPLICABLE TO PRESSURE AND VACUUM BRAKE PIPES.

1,343,084. Specification of Letters Patent. Patented June 8, 1920.

Application filed October 31, 1919. Serial No. 334,844.

*To all whom it may concern:*

Be it known that I, ERNST KESSLER, a citizen of the Swiss Republic, and a resident of Biel, Switzerland, have invented certain new and useful Improvements in Hose-Couplings Especially Applicable to Pressure and Vacuum Brake Pipes, of which the following is a specification.

This invention relates to a coupling for hose or flexible pipes and is especially adapted to air-pressure and vacuum brake pipes.

The invention refers more particularly to such couplings of the kind in which the fluid supply through the pipes is open when the coupling is effected and is shut off when the parts are uncoupled the opening or the closing of the ways being positively effected by the connection or disconnection of the coupling heads.

The invention comprises an arrangement such that the rotation of the coupling head to couple or uncouple the parts moves a valve parallel to itself from or to its seat within the coupling head thereby opening or closing communication for the passage of the pressure fluid or vacuum between the two pipes.

The invention further comprises means whereby the initial movement of the valve from its seat opens a way or passage between the inlet and outlet sides of the valve so as to equalize the pressure of the fluid on both sides of the valve which is thereafter fully opened.

In the accompanying drawings which illustrate one form of construction of the invention, Figure 1 is a plan view, the fully drawn lines representing the coupler-head I, and the dot and dash lines parts of the head II to be coupled therewith;

Fig. 2 is an end view of one coupler head I, the dotted lines representing parts of the coupler head II after the coupling action between them has been commenced;

The casing $a'$ of the coupler-head I with the coupling extension $v'$, the sector-shape abutment $w'$ and the junction $x$ for the hose connection correspond in the main with the formation of a normal head of the usual hose-coupling of a pressure brake pipe, with the exception that to the ring $y$ around the passage $d$ and serving as a packing for tightening the head I to the head II, is affixed a valve seat $z$.

Screwed into the casing $a'$ is a cylinder $c$ having on the inside two guide-pieces $b$ and carrying a series of rods $z'$ which press against the valve seat $z$. Within the cylinder is arranged a block $e$ having side lugs $e'$ which engage the guide pieces $b$ on the cylinder $c$ and slide thereon. The block $e$ is internally screw-threaded and on the end that is toward the valve seat $z$ it is provided with an externally screw-threaded pin or stem $u$ on which the annular valve $o$ is held with a certain amount of play in the following manner. On the pin $u$ is a nut the outside diameter of which is somewhat smaller than the inner diameter of the valve $o$ said nut being provided with lateral projections $n$ which press on the valve $o$. The internal thread in the block $e$ is engaged by a screw thread $g'$ on a spindle $g$ rotatably mounted in a disk $h$ secured to the cylinder $c$, and rigidly connected with the bell-shaped closing cap $k$, the edge of which slides on the edge of the cylinder $c$. The closing cap $k$ is provided with an arm $j$ that runs parallel to the axis of the cylinder $c$, and with a laterally projecting piece $t$ that serves as a hand lever.

When the head II is coupled with the head I the end of the arm $j$ comes within the area of an abutment $w''$ on the head II that serves as a guide for a coupling extension $v'$ on the head I, and thus acts as a device for actuating and subsequently locking the arm $j$.

Figure 4:
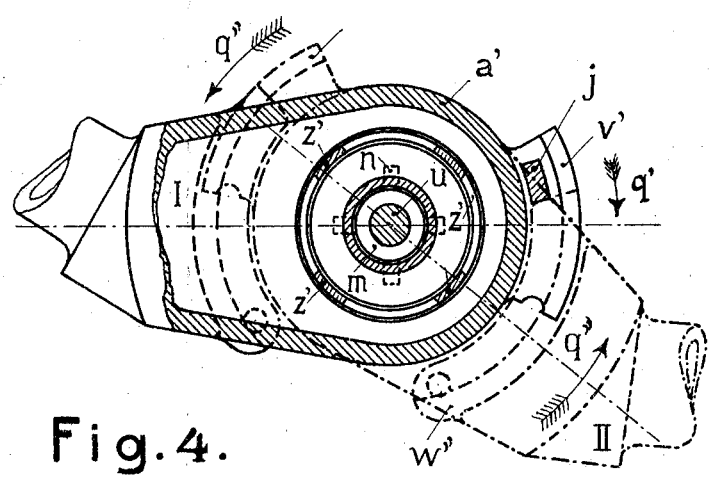
Fig. 4 is a transverse section taken on the line A—B in Fig. 3.
Figure 3:
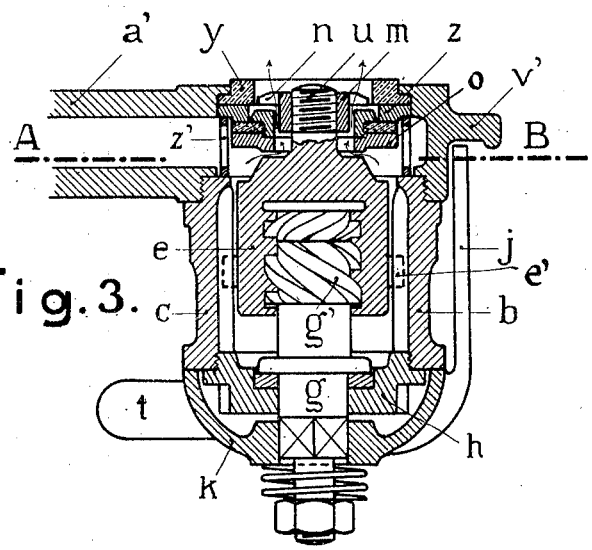
Fig. 3 is a horizontal section of the coupler-head I with the valve shown in the relieved position, that is, shortly after the beginning of the coupling action.

When, in the coupling operation, the two heads I and II have been rotated to a certain small extent in relation to one another around one and the same axis, the abutment $w''$ on the head II comes into contact with the arm $j$ on the head I and as the heads further rotate the abutment on the head II begins to carry the arm $j$ on the head I along with it. In the same manner and at the same time the abutment $w'$ on the head I actuates a corresponding arm (not shown in the drawing) on the head II, where this latter is substantially the same as the head I. The direction of movement of the two coupler-heads is indicated by arrows q' and q'' shown in Fig 4 pointing in opposite directions.

Figure 6:
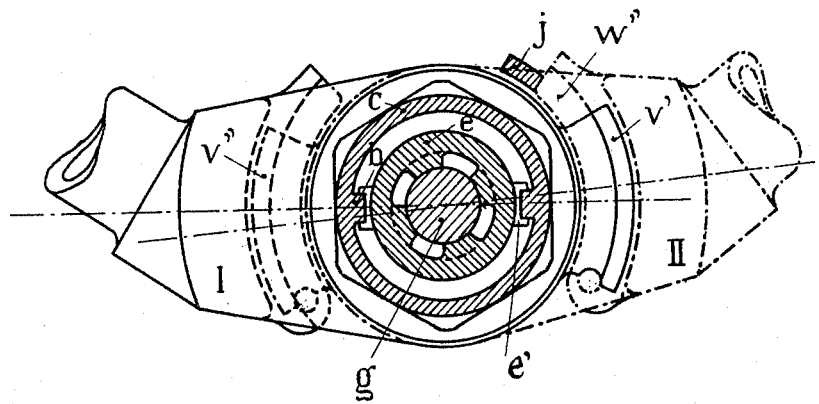
Fig. 6 is a similar section taken on the line C—D in Fig. 5.
Figure 5:
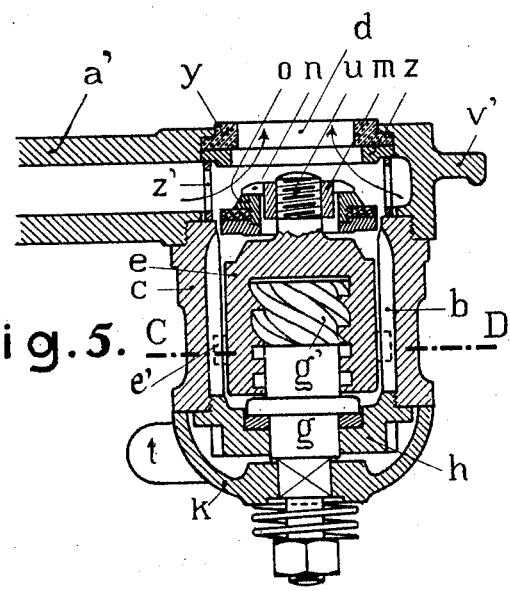
Fig. 5 is a similar view with the valve in the fully open position.

The motion imparted to the arm j through the abutment w'' is transmitted through the closing cap k to the rotary spindle g. Thereby the block e is positively moved along the guide pieces b. Precisely at the beginning of this movement the pressure of the block on the valve o is diminished and then ceases. Through the gap so arising between the block e and the valve o and through the annular gap between the outer diameter of the nut on the pin or stem u and the inside of valve o air or other pressure fluid then flows, thus producing an equilibrium of pressure on the inlet and outlet sides of the valve. In the further course of the coupling operation the heads I and II leave the relative positions as in Fig. 4 and assume those shown in Fig. 6. Their relative rotation (to the extent of 60°) is participated in on the one hand by the casing a' with the cylinder c and the block e, and on the other hand by the arm j with the closing cap k and the rotary spindle g. When this movement is ended the valve o is fully removed from its seat, Fig. 5. Thus through the coupling operation itself the passage d is freed as required and this is assured in all circumstances, even with the most violent shaking of the hose pipe in which the described hose-coupling is arranged as well as in the case of fracture of the carriage coupling and rupture of the hose-coupling. The possibility occasioned by the loose connection between the block e and the valve o of equalizing the pressure on the inlet and outlet sides of the coupler head when coupling and uncoupling take place also becomes of value for example when additional carriages have to be attached to a train standing ready to start, the brake air-pipe of which carriages is free from pressure. Through the rapid filling of the pipe with compressed air a troublesome shock which causes noise is produced.

If the coupler head on the pipe to be coupled is constructed exactly like that herein described, both coupler heads are seized by the hand-levers t and raised in order to release the hose-coupling. This produces a relative rotation of the heads in opposite directions to those when the coupling is effected. The valve o is thus moved gradually toward its seat z and finally pressed thereon, that is to say, put in the closing position and after this has been done the heads are separated but only after they have been further relatively rotated. Any closing of the valve through unintended rotation of the coupler-heads, for example, in the case of jolting of the hose-pipe is rendered impossible. This can only happen when the hose-coupling is raised by the hand lever t, a movement to which resistance is offered by the more or less rigid hose.

The above described arrangement of a hose-coupling has also the considerable economical advantage that existing coupler heads can be easily fitted with it as an important part of such can be used viz., the casing with hose junction, coupling extension, abutment and packing or tightening ring.

Having fully described my invention what I claim and desire to secure by Letters Patent, is:—

1. A hose-coupling comprising a coupler-head, a valve seating within said head, an annular valve loose in said head, an internally threaded block slidably mounted in said head, a closing cap rotatably mounted on the coupler-head and a screwed stem rigidly secured to said cap.

2. A hose-coupling comprising a coupler-head, a valve seating within said head, an annular valve loose in said head, an internally threaded block slidably mounted in said head, a closing cap rotatably mounted on the coupler-head, a screwed stem rigidly secured to said cap, a threaded extension to the block, a nut on said extension and flanges on said nut to bear against one face of said valve.

3. A hose-coupling comprising a coupler-head, a valve seating within said head, an annular valve loose in said head, an internally threaded block slidably mounted in said head, a closing cap rotatably mounted on the coupler-head, a screwed stem rigidly secured to said cap, a threaded extension to the block, a nut on said extension of smaller external diameter than the internal diameter of the loose annular valve, and flanges on said nut to bear against one face of said valve.

4. A hose-coupling comprising a casing secured to the hose and having a coupling extension on one side and a sector-shaped abutment on the other, a cylinder secured to said casing, an apertured disk secured in said cylinder, a closing cap freely rotatable on said cylinder, an arm on said cap parallel to the axis of the cylinder, a lateral projection or wing on said cap, a screw-threaded spindle rigidly attached to said cap and rotatably mounted in the apertured disk, an internally threaded block within the cylinder with which the threaded spindle engages, lugs on said block, guides on the interior of said cylinder on which said lugs engage, an annular valve loosely mounted on the inner end of the block, a screw-threaded pin on the block passing through the aperture in the valve, a nut on said pin having flanges which bear on the seating face of the valve, and a valve seating on the inside of the casing.

5. A hose-coupling comprising a casing secured to the hose and having a coupling extension on one side and a sector-shaped abutment on the other, a cylinder secured to said casing, an apertured disk secured in said cylinder, a closing cap freely rotatable on said cylinder, an arm on said cap parallel to the axis of the cylinder, a lateral projection or wing on said cap, a screw-threaded spindle rigidly attached to said cap and rotatably mounted in the apertured disk, an internally threaded block within the cylinder with which the threaded spindle engages, lugs on said block, guides on the interior of said cylinder on which said lugs engage, an annular valve loosely mounted on the inner end of the block, a screw-threaded pin on the block passing through the aperture in the valve, a nut on said pin of smaller external diameter than the interior diameter of the loose annular valve, flanges on said nut which bear on the seating face of the valve, and a valve seating on the inside of the casing.

In testimony whereof I affix my signature in presence of two witnesses.

ERNST KESSLER.

Witnesses:
JULIE HESS,
H. H. DICK.